(12) United States Patent
Hayes et al.

(10) Patent No.: US 8,035,880 B2
(45) Date of Patent: Oct. 11, 2011

(54) DISPLAY DEVICE BASED ON ELECTROWETTING EFFECT

(75) Inventors: Robert A. Hayes, Eindhoven (NL); Mickael Joulaud, Mondoui (IT); Thibault J B Roques-Carmes, Nancy (FR); Stephanie A. Palmier, Ramonville (FR)

(73) Assignee: Liquavista, B.V., Eindhoven (NL)

(*) Notice: Subject to any disclaimer, the term of this patent is extended or adjusted under 35 U.S.C. 154(b) by 0 days.

(21) Appl. No.: 12/784,940

(22) Filed: May 21, 2010

(65) Prior Publication Data

US 2010/0296150 A1 Nov. 25, 2010

Related U.S. Application Data

(63) Continuation of application No. 11/547,602, filed as application No. PCT/IB2005/051091 on Apr. 1, 2005, now Pat. No. 7,800,816.

(30) Foreign Application Priority Data

Apr. 5, 2004 (EP) .................................. 04101407

(51) Int. Cl.
*G02F 1/03* (2006.01)
*G02F 1/29* (2006.01)
*G02B 26/02* (2006.01)

(52) U.S. Cl. ........ 359/245; 359/318; 359/320; 359/321; 359/228; 345/41; 345/60; 345/84

(58) Field of Classification Search .................. 359/228, 359/237, 240, 245, 252, 259, 315, 316, 318, 359/320, 321; 345/41, 60, 84, 204; 385/16–19, 385/140
See application file for complete search history.

(56) References Cited

U.S. PATENT DOCUMENTS

| 3,458,328 | A | 7/1969 | Zola |
| 3,838,029 | A | 9/1974 | Fischer et al. |
| 5,389,546 | A | 2/1995 | Becket |
| 5,956,005 | A | 9/1999 | Sheridon |
| 6,400,885 | B1 | 6/2002 | Hu et al. |
| 6,449,081 | B1 * | 9/2002 | Onuki et al. .................. 359/245 |
| 6,514,328 | B1 | 2/2003 | Katoh et al. |
| 6,603,444 | B1 * | 8/2003 | Kawanami et al. ............. 345/32 |

(Continued)

FOREIGN PATENT DOCUMENTS

EP 1180713 2/2002

(Continued)

OTHER PUBLICATIONS

R A. Hayes et al., "Video-speed Electronic Paper Based on Electrowetting", Nature, Macmillan Journals Ltd., London, GB, vol. 425 (6956), pp. 383-385 (2003).

(Continued)

*Primary Examiner* — Loha Ben
(74) *Attorney, Agent, or Firm* — BainwoodHuang

(57) ABSTRACT

In a reflective a display device based on layer break up or layer displacement having at least two different states, in which one of the fluids (5) e.g. oil in a first state adjoins at least a first support plate (3) and in the second state the other fluid (6) at least partly adjoins the first support plate, in which picture elements are separated by areas (13) having a hydrophilic surface dyes (or sometimes pigments) are added to the oil (usually hydrocarbon but also possibly silicone or fluorocarbon), to provide sufficient optical intensity.

8 Claims, 2 Drawing Sheets

U.S. PATENT DOCUMENTS

| | | | |
|---|---|---|---|
| 7,027,683 B2 * | 4/2006 | O'Connor et al. | 385/19 |
| 7,141,279 B2 * | 11/2006 | Liang et al. | 428/1.5 |
| 7,529,012 B2 * | 5/2009 | Hayes et al. | 359/228 |
| 2005/0104804 A1 | 5/2005 | Feenstra et al. | |

FOREIGN PATENT DOCUMENTS

| | | |
|---|---|---|
| JP | 11038336 A | 2/1999 |
| JP | 2001-228307 A2 | 8/2001 |
| WO | 03/071346 | 8/2003 |
| WO | 2004/027489 | 4/2004 |

OTHER PUBLICATIONS

T. Roques-Carmes et al., "Liquid Behavior Inside a Reflective Display Pixel Based on Electrowetting", Journal of Applied Physics, vol. 95 (8), pp. 4389-4396 (2005).

Beni et al., "Electro-wetting Displays," Appl. Phys. Lett., 38 (4), Feb. 15, 1981, pp. 207-209.

* cited by examiner

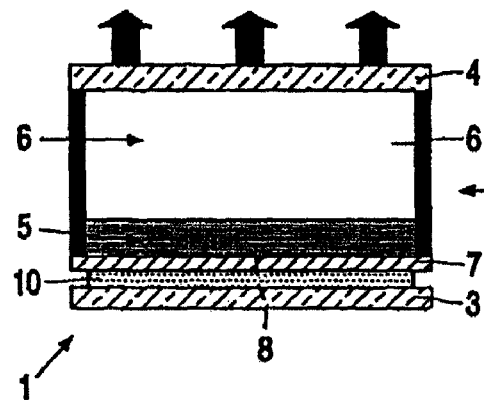
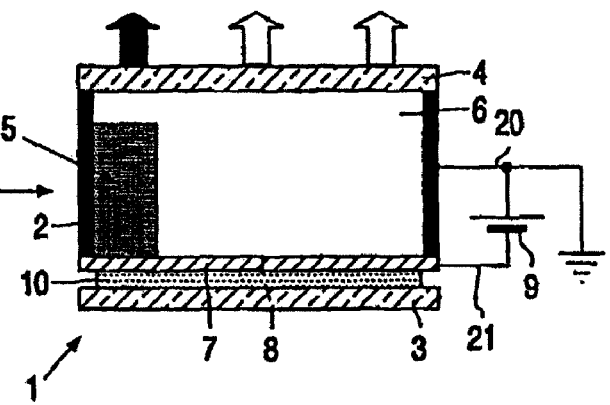
FIG. 1a  FIG. 1b
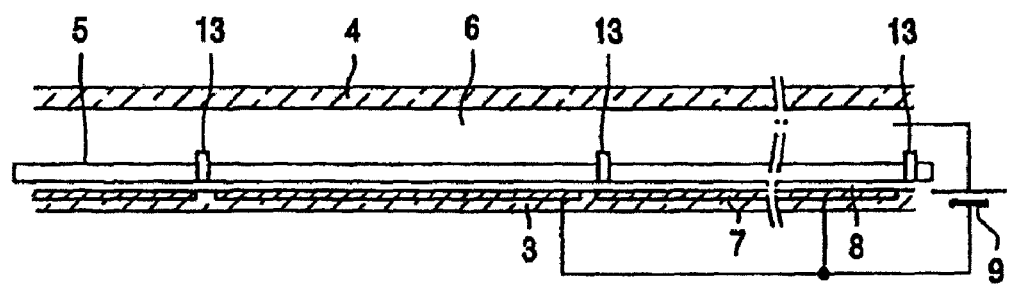
FIG. 2

DISPLAY DEVICE BASED ON ELECTROWETTING EFFECT

CROSS REFERENCE TO RELATED APPLICATIONS

This Patent Application is a Continuation of U.S. patent application Ser. No. 11/547,602 filed on Apr. 21, 2008, entitled, "DISPLAY DEVICE BASED ON ELECROWETTING EFFECT," now U.S. Pat. No. 7,800,816 which is the U.S. national phase of International Application PCT/IB2005/051091 filed Apr. 1, 2005, which designates the U.S. and claimed priority of EP 04101407.7, filed Apr. 5, 2004, the contents and teachings of which are hereby incorporated by reference in their entirety.

FIELD

The invention relates to an optical switch comprising at least one first fluid and a second fluid immiscible with each other within a space between a first transparent support plate and a second support plate, the second fluid being electroconductive or polar.

In particular the invention relates to a display device comprising picture elements (pixels) having at least one first fluid and a second fluid immiscible with each other within a space between a first transparent support plate and a second support plate, the second fluid being electroconductive or polar.

BACKGROUND

Optical switches may be used in shutter applications, diaphragms, but also in switchable color filters in e.g. display applications. If the fluid is a (colored) oil and the second fluid is water (due to interfacial tensions), a two-layer system is provided which comprises a water layer and an oil layer. However, if a voltage is applied between the water and an electrode on the first support plate, the oil layer moves aside or breaks up due to electrostatic forces. Since parts of the water now penetrate the oil layer, the picture element becomes partly transparent.

Display devices based on this principle have been described in PCT-Application PCT/IB03/00196 (PH-NL 02.0129).

When used in a reflective display the optical performance of a picture element depends a. o. on the optical intensity of the colored film in the non-reflective state (off state) dyes (or sometimes pigments) are added to the oil (usually hydrocarbon but also possibly silicone or fluorocarbon), to provide sufficient optical intensity. Using the electro-wetting display principle the brightness in the reflective state (on state) is dependent on the scattering properties of the (underlying) substrate and the area fraction occupied by residual oil. This implies that the use of as little oil as possible will yield a high brightness. Contrast however also depends on the intensity and homogeneity of the optical intensity of the colored film in non-reflective state, so for high contrast a thicker layer of oil would be preferable.

SUMMARY

It is one of the objects of the present invention to overcome at least partly the above-mentioned requirement.

To this end an optical device according to the invention comprises oil comprising a dye the concentration of the dye being at most 1 M (mol/L). It can be shown that such oils can be used to find a good compromise between the requirements mentioned above. Suitable oils are e.g. alkane based oils colored with non-polar dyes, for example Oil Blue N (alkylamine substituted anthraquinone), Solvent Green, Sudan Red and Sudan Black. The concentration of the dye should exceed 0.01M to obtain a good color quality.

For independently characterizing a solution a Figure of Merit (FoM) is defined as (FoM=$\epsilon \cdot C$) in which $\epsilon$ is the extinction coefficient of the dye and C is the concentration of the dissolved dye in the first fluid. Preferably, for a layer thickness of 10 μm of the first fluid, the device has a Figure of Merit (FoM=$\epsilon \cdot C$) of at least 100 $cm^{-1}$, more preferably at least 500 $cm^{-1}$ and most preferably at least 1000 $cm^{-1}$.

These and other aspects of the invention are apparent from and will be elucidated with reference to the embodiments described hereinafter.

BRIEF DESCRIPTION OF THE DRAWINGS

In the drawings:

FIG. 1 is a diagrammatic cross-section of a part of a display device, to show the principle on which a display device according to the invention is based, FIG. 2 shows a further diagrammatic cross-section of a part of such a display device.

The Figures are diagrammatic and not drawn to scale. Corresponding elements are generally denoted by the same reference numerals.

DETAILED DESCRIPTION

Figure 3:
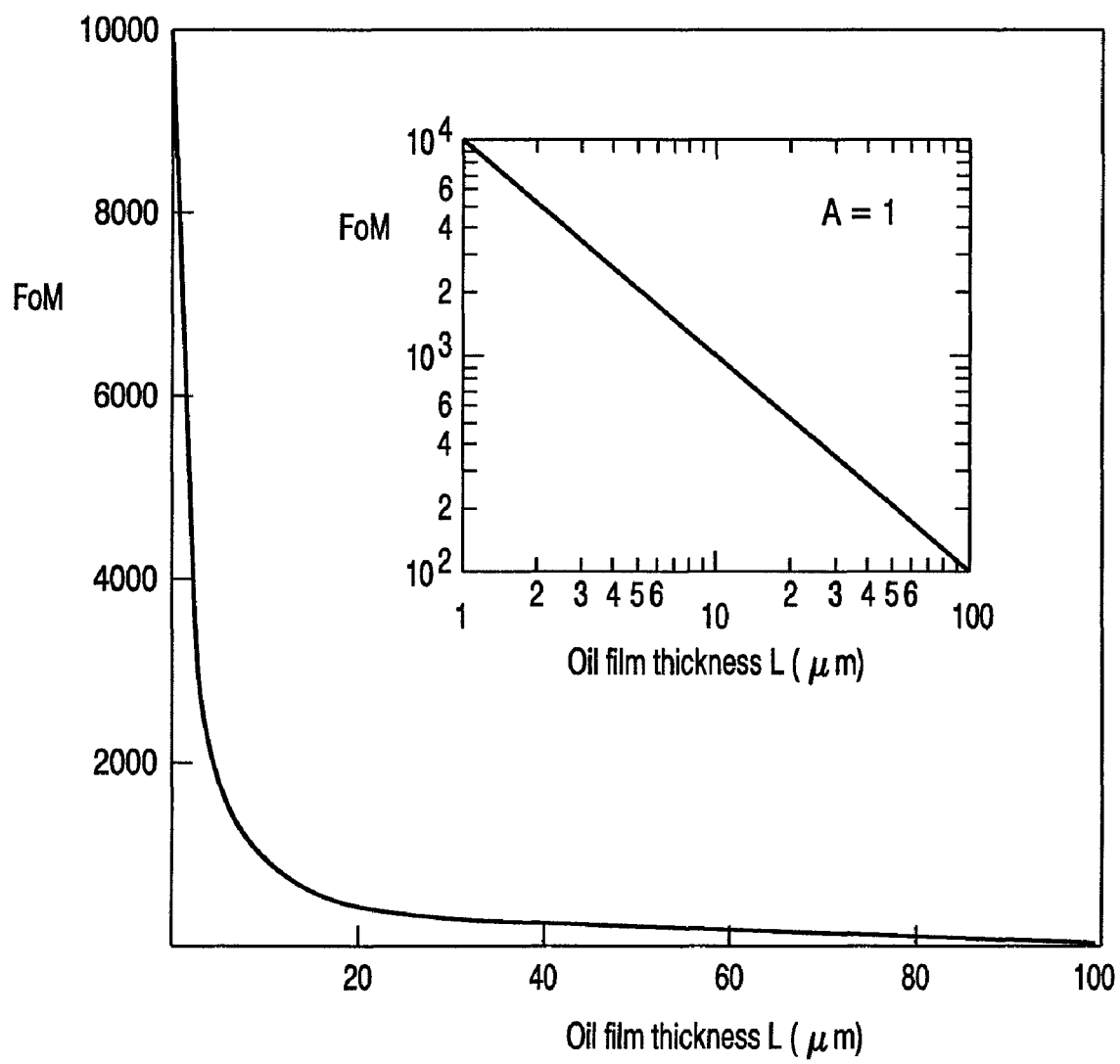
FIG. 3 is a diagram showing the relationship between the Figure of Merit (FoM=$\epsilon \cdot C$) and oil film thickness, l, required to meet a certain optical activity criterion (Absorbance, or Optical Density, A=1).

FIG. 1 shows a diagrammatic cross-section of a part of a display device 1 which shows the principle on which a display device according to the invention is based. Between two transparent substrates or support plates 3, 4 a first fluid 5 and a second fluid 6 are provided, which are immiscible with each other. The first fluid 5 is for instance an alkane like hexadecane or as in this example colored oil. The second fluid 6 is electroconductive or polar, for instance water or a salt solution (e.g. a solution of KCl in a mixture of water and ethyl alcohol).

In a first state, when no external voltage is applied (FIG. 1a, off state) the fluids 5, 6 adjoin the first and second transparent support plates 3, 4 of e.g. glass or plastic. On the first support plate 3 a transparent electrode 7, for example indium (tin) oxide is provided and an intermediate less wettable (hydrophobic) layer 8, in this example an amorphous fluoropolymer (AF1600).

When a voltage is applied (voltage source 9) via interconnections 20, 21 the layer moves aside or breaks up into small droplets (FIG. 1b, on state). This occurs when the electrostatic energy gain is larger than the surface energy loss due to the creation of curved surfaces. As a very important aspect it was found that reversible switching between a continuous film 5 covering the support plate 3 and a film adjoining the wall 2 is achieved by means of the electrical switching means (voltage source 9).

FIG. 2 shows an embodiment of a display device according to the invention, in which walls between separate picture elements have been omitted for the greater part for the sake of clarity. In this embodiment the pixel walls 13 do not extend across the whole pixel thickness. Such walls may be obtained by offset printing or other printing techniques known in the art. It appears that the oil film 5 is very stable, which is enhanced even further as the pixel size decreases. So during switching the oil remains confined in each area. The other reference numerals have the same meaning as those in FIG. 1.

The display has been made reflective by adding a reflector 10 as shown in FIG. 1. The optical performance of a display pixel depends essentially on the optical intensity of the colored film in the off state as well as the reflectivity and exposed part of the reflector 10 upon switching. Dyes (or sometimes pigments) are added to the oil (usually hydrocarbon but also possibly silicone or fluorocarbon), to provide sufficient optical intensity.

The contrast (CR) of a display pixel however also depends on the intensity and homogeneity of the pixel in its off state and can be calculated as:

$$CR = (R_{white}/R_{black}) \cdot (1 - \text{coverage}) \quad (1)$$

where "$R_{white}$" and "$R_{black}$" are the reflectivities of the uncovered area of a pixel in the on state and for the off state respectively, and "coverage" is the area occupied by oil in the on-state. For an oil residue of about 25% the following contrast values can then be obtained as a function of white and black reflectivities:

|              |             | $R_{white}$ |      |      |
|--------------|-------------|-------------|------|------|
| $T_{film}(\%)$ | $R_{black}$ | 0.5         | 0.7  | 0.9  |
| 40           | 0.16        | 2.3         | 3.3  | 4.2  |
| 30           | 0.09        | 4.2         | 5.8  | 7.5  |
| 20           | 0.04        | 9.4         | 13.1 | 16.9 |
| 10           | 0.01        | 38          | 53   | 67.5 |

$T_{film}$ in Table 1 corresponds to the percentage of light transmitted during a single pass through the absorbing layer (film). Contrast ratios of about 10 are required for paper-like optical characteristics. Because reflected light must pass through the colored oil film twice the black reflectivity $R_{black}$ is extremely low for an absorbing layer (film) having $T_{film}=10\%$ (absorbance A=1). It also appears that the contrast depends most strongly on the reflectivity of the dark state and much less so on white reflectivity and residual oil coverage.

FIG. 3 shows the relationship between the Figure of Merit (FoM=$\epsilon \cdot C$) and oil film thickness, l, required to meet a certain optical activity criterion (Absorbance, or Optical Density, A=1).

Increasing the optical activity of the pixel 'off-state' can be done by using dyes that combine high extinction coefficient ($\epsilon$) with high oil solubility. Dye absorbance (A) is commonly related to concentration using the Beer-Lambert Law:

$$A = \log_{10}(I_o/I) = \epsilon \cdot C \cdot l \quad (2)$$

where $I_o$ is the incident intensity, I the transmitted intensity, C the concentration and l the optical path length. Thus when the concentration is expressed in molar units M per litre (mol/L) and length in cm, $\epsilon$ has units of $M^{-1}cm^{-1}$.

With respect to the intensity of the colored oils an absorbance of 1 (10% transmission) is chosen as a good example. This means that as light incident on the display must pass twice through the oil film before reaching the viewer that virtually all light (i.e. 99%) is absorbed in the specific absorbing range of the colorant (producing red, green, or blue in the case of a display based on primary colors and cyan, magenta or yellow in the case of a display using subtractive colors as the reflected colors). For a given oil film thickness (10 μm) and therefore path length, the following Figure of Merit (FoM) is used in this patent application to define the optical intensity:

$$\text{FoM} = \epsilon \cdot C \, [\text{cm}^{-1}] \quad (3)$$

where $\epsilon$ is the extinction coefficient of the dye which is intrinsic and C is the concentration of the dissolved dye in the oil phase in M (mol/L).

With a film absorbance of 1 (90% absorption in a film thickness of 10 μm) which can be achieved, for example, with a dye concentration of 0.01 M and dyes having extinction coefficients of $10^4$-$10^5$, Figure of Merits were obtained between 100 $cm^{-1}$ and 1000 $cm^{-1}$.

To obtain a good solution of for instance powered Oil Blue N (alkylamine substituted anthraquinone) in an alkane such as decane the following recipe was employed to increase the solubility. A dispersion or partial solution was first put in a sonic bath, then on a heating plate for while stirring it and then cooled to room temperature and filtered at e.g. 0.2 μm to remove undissolved dye. In this way Figure of Merits of about 225 were obtained.

An alternative methodology involves the use of non-polar liquid dyes, for example Sudan Red 500, Sudan Blue 673 and Sudan Yellow 172 (supplied by BASF). In this case the dyes can be much higher in concentration with FoM's of 7500 $cm^{-1}$, 15000 $cm^{-1}$ and 30000 $cm^{-1}$, respectively and the formulation of these dyes consists of dilution to the desired FoM in the alkane of choice, and purification steps to remove volatile contaminants and particulate residues. In this way the colored oil solutions are sufficiently concentrated to meet the 10% transmission criterion in film thicknesses less than 2 microns.

Several variations to the principle are possible. Although a reflective device has been described the invention also applies to transmissive display devices.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

What is claimed is:

1. An optical switch comprising a first transparent support plate and a second support plate and at least a first fluid and a second fluid immiscible with each other within a cavity between the first support plate and the second support plate, a dye being dissolved in the first fluid and the second fluid being electroconductive or polar, the first fluid being switchable between a first state in which the first fluid forms a layer in a path of light in the cavity and a second state in which the first fluid is moved aside or is broken up in small droplets, and the first fluid having a Figure of Merit (FoM=$\epsilon \cdot C$) of at least 1000 $cm^{-1}$, $\epsilon$ being an extinction coefficient and C a concentration of the dye.

2. An optical switch according to claim 1, wherein the dissolved dye is replaced by a pigment.

3. An optical switch according to claim 2, wherein the concentration of the dye is at most 1 M (mol/L).

4. An optical switch according to claim 1 or 2, wherein the concentration of the dye is at most 0.1 M.

5. An optical switch according to claim 1 or 2, wherein the concentration of the dye is at least 0.01 M.

6. An optical switch according to any one of claims 1 to 3, wherein the first fluid comprises an oil and wherein the oil comprises at least one of silicone oil, hydrocarbon oil or fluorocarbon oil.

7. A display device comprising picture elements, each picture element comprising an optical switch according to any one of claims 1 to 3.

8. An optical switch according to claim 1, wherein the concentration of the dye is at most 1 M (mol/L).

* * * * *

UNITED STATES PATENT AND TRADEMARK OFFICE
CERTIFICATE OF CORRECTION

| | |
|---|---|
| PATENT NO. | : 8,035,880 B2 |
| APPLICATION NO. | : 12/784940 |
| DATED | : October 11, 2011 |
| INVENTOR(S) | : Hayes et al. |

It is certified that error appears in the above-identified patent and that said Letters Patent is hereby corrected as shown below:

Replace claims 1 to 8 with the following replacement claims 1 to 8 which extend from Column 4, Line 46 to Column 6, Line 2:

--1. An optical switch comprising a first transparent support plate and a second support plate and at least a first fluid and a second fluid immiscible with each other within a cavity between the first support plate and the second support plate, a dye being dissolved in the first fluid and the second fluid being electroconductive or polar, the first fluid being switchable between a first state in which the first fluid forms a layer in a path of light in the cavity and a second state in which the first fluid is moved aside or is broken up in small droplets, and the first fluid having a Figure of Merit (FoM = å.C) of at least 1000 cm-1, å being an extinction coefficient and C a concentration of the dye.

2. An optical switch according to Claim 1, wherein the concentration of the dye is at most 1 M (mol/L).

3. An optical switch according to Claim 1, wherein the dissolved dye is replaced by a pigment.

4. An optical switch according to Claim 3, wherein the concentration of the dye is at most 1 M (mol/L).

5. An optical switch according to any one of Claims 1 to 4, wherein the first fluid comprises an oil and wherein the oil comprises at least one of silicone oil, hydrocarbon oil or fluorocarbon oil.

6. A display device comprising picture elements, each picture element comprising an optical switch according to any one of Claims 1 to 4.

7. An optical switch according to Claim 1 or 3, wherein the concentration of the dye is at most 0.1 M.

8. An optical switch according to Claim 1 or 3, wherein the concentration of the dye is at least 0.01 M.--

Signed and Sealed this
Fifteenth Day of November, 2011

David J. Kappos
*Director of the United States Patent and Trademark Office*

UNITED STATES PATENT AND TRADEMARK OFFICE
CERTIFICATE OF CORRECTION

PATENT NO.        : 8,035,880 B2
APPLICATION NO.   : 12/784940
DATED             : October 11, 2011
INVENTOR(S)       : Hayes et al.

It is certified that error appears in the above-identified patent and that said Letters Patent is hereby corrected as shown below:

Replace claims 1 to 8 with the following replacement claims 1 to 8 which extend from Column 4, Line 46 to Column 6, Line 2:

--1. An optical switch comprising a first transparent support plate and a second support plate and at least a first fluid and a second fluid immiscible with each other within a cavity between the first support plate and the second support plate, a dye being dissolved in the first fluid and the second fluid being electroconductive or polar, the first fluid being switchable between a first state in which the first fluid forms a layer in a path of light in the cavity and a second state in which the first fluid is moved aside or is broken up in small droplets, and the first fluid having a Figure of Merit (FoM = $\varepsilon.C$) of at least 1000 $cm^{-1}$, $\varepsilon$ being an extinction coefficient and C a concentration of the dye.

2. An optical switch according to Claim 1, wherein the concentration of the dye is at most 1 M (mol/L).

3. An optical switch according to Claim 1, wherein the dissolved dye is replaced by a pigment.

4. An optical switch according to Claim 3, wherein the concentration of the dye is at most 1 M (mol/L).

5. An optical switch according to any one of Claims 1 to 4, wherein the first fluid comprises an oil and wherein the oil comprises at least one of silicone oil, hydrocarbon oil or fluorocarbon oil.

6. A display device comprising picture elements, each picture element comprising an optical switch according to any one of Claims 1 to 4.

7. An optical switch according to Claim 1 or 3, wherein the concentration of the dye is at most 0.1 M.

This certificate supersedes the Certificate of Correction issued November 15, 2011.

Signed and Sealed this
Twelfth Day of June, 2012

David J. Kappos
*Director of the United States Patent and Trademark Office*

8. An optical switch according to Claim 1 or 3, wherein the concentration of the dye is at least 0.01 M.--